May 24, 1960 W. COLE 2,937,409
METHOD OF MANUFACTURE
Filed Feb. 9, 1954

INVENTOR.
Ward Cole
BY
Attorney

United States Patent Office 2,937,409
Patented May 24, 1960

2,937,409

METHOD OF MANUFACTURE

Ward Cole, Anderson, Ind., assignor to General Motors Corporation, Detroit, Mich., a corporation of Delaware Filed Feb. 9, 1954, Ser. No. 409,085

1 Claim. (Cl. 18—59)

This invention relates to a method of molding and is particularly concerned with a method of molding switch members having flush surface inserts or contacts molded therein wherein the surface of the contact is free from flash.

It is, therefore, the basic object of the invention to provide a method for molding switch members including flush surface switch contacts therein wherein the mold includes positive means for preventing flash formation over the surface of the switch contacts during the molding operation.

In carrying out this object, it is a further object to provide sealing means, such as a dam, which encloses and protects the surface of the switch contact from molding material during the molding operation whereby no subsequent cleaning operation is required.

Further objects and advantages of the present invention will be apparent from the following description, reference being had to the accompanying drawing, wherein preferred embodiments of the present invention are clearly shown.

In the manufacture of switch members or contact members having flush surface metallic contacts therein which are embedded in a molded dielectric compound, there is always a considerable problem in the molding operation concerning flash formation over the surface of the contact which is to remain exposed. This flash formation requires a subsequent cleaning operation, such as wire bushing, etc., which mars the surface of the molded member and which scratches the surface of the contact. Furthermore, the elimination of the flash is an added operation which increases the overall cost of the part involved.

Figure 5:
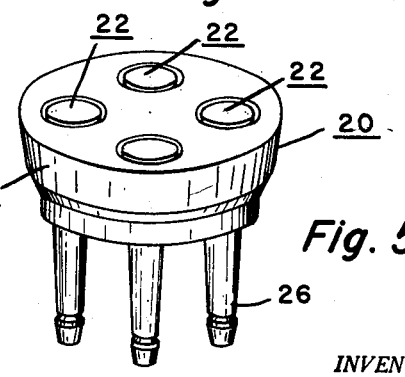
Fig. 5 is a perspective view of a finished molded switch member which may be made by the method disclosed herein.

I have devised an entirely new method of molding such articles wherein the contact surface which is to remain exposed is protected against ingress of any molding compound whereby flash is completely eliminated therefrom. A typical molded switch or contact member is shown at 20 in Fig. 5 wherein a plurality of flush surface contacts 22 are embedded in the surface of a molded member 24 which surrounds and carries the contacts. Contacts 22 each have a stem portion 26 integrally formed therewith which extends outwardly from the lower portion of the molded part 24 of the member 20.

In order to accomplish the desired end, a mold 30, having a cavity 32 therein of the desired shape, is provided. The mold 30 includes a lower mold member 34 which generally carries the cavity 32 and an upper mold member 36 which is used to close the mold cavity 32. The upper mold member 36 also includes a dam portion 38 which, in this case, is an annulus of metal that extends a short distance below the major surface of the member 36 into the cavity 32.

Figure 1:
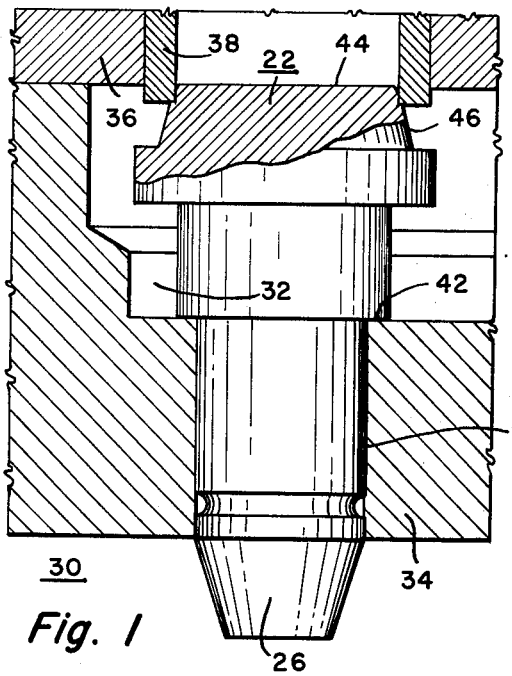
Fig. 1 is a fragmentary view in cross section of a mold in closed position with a switch contact therein.
Figure 2:
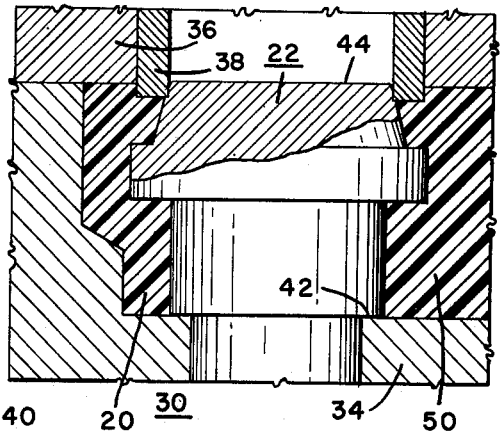
Fig. 2 is a view of the mold shown in Fig. 1 with the molding compound in place.
Figure 3:
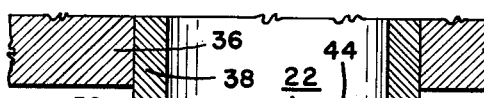
Fig. 3 is a view of the mold being opened after the molding operation is complete.
Figure 4:
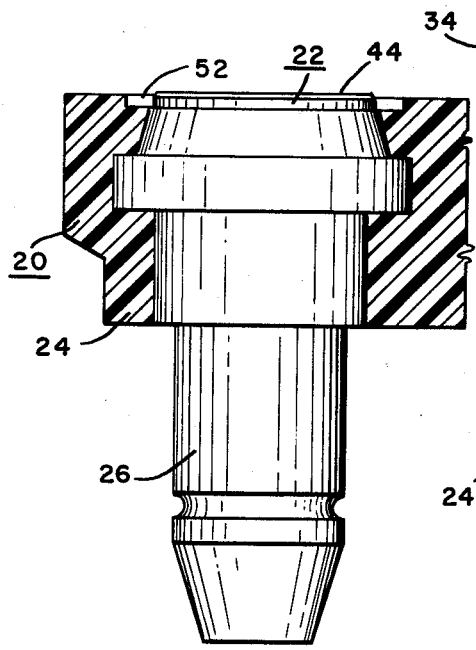
Fig. 4 is a fragmentary view of a finished molded switch member in cross section.

In the use of the mold, the stem 26 of contact 22 is placed in a receiving aperture 40 within the lower mold member 34. It is apparent that any number of contacts may be positioned in this manner, the drawing merely being directed to a single contact for purpose of facile explanation. The contact 22 is positively positioned in the cavity 32 by an abutment of a shoulder 42 against the lower mold surface. The face of contact 22 is noted at 44 and is tapered as at 46 from the shank to the upper portion thereof, which taper is subsequently used to seal the molding compound from the face 44 in a manner to be described. In this connection, the inner diameter of the annular dam 38 is greater than the end diameter of the contact face 44 but is less than the greatest diameter of the tapered portion 46 thereof. Thus when the mold member 36 is positioned to close the cavity 32 through the use of suitable positioning means, such as dowel pins, etc. (not shown), the internal edge of the dam 38 bites into the tapered wall 46 of the contact 22 and seals the upper face 44 of the contact by means of the annular dam 38 therearound so that when molding compound 50 is distributed around the contact 22 and within the cavity 32, the face 40 of the contact 22 is sealed therefrom so that no molding compound can flash thereover. In this connection, it will be seen that the face 44 of contact 22 still remains flush with the upper surface of the molded member 24 as noted in Fig. 4, but that in the finished article an annular depression 52 is formed around the contact face 44 upon the removal of the dam 38 after the molding operation is completed.

It is quite apparent that any shape flush surface which is desired to be exposed may be sealed off in a molding operation by the use of a dam of proper shape. Furthermore, the depth of the annular recess 52 may vary in accordance with the width of the dam 38, such modifications all coming fully within the scope of my invention.

The particular molding compound and method of filling the cavity forms no part of this invention since this molding compound (thermoplastic or thermosetting) may be injected into the cavity after the cavity has been closed or it may be filled into the cavity in the form of a molding powder and distributed therein by heat and pressure after closing of the mold and sealing off of the contact surface, either of such expediencies being well known in the art.

In the aforegoing paragraph, it is manifest that I have provided an efficient method for sealing the surfaces of the inserts which are to remain exposed during a molding operation whereby the flush faces do not require subsequent cleaning and removing flash which normally forms thereover. It is apparent that this method of operation, therefore, reduces the cost of the molding operation and facilitates the manufacture of parts free from flash. It should also be understood that particular mold design is not limiting and that the cavity may be carried fully or in part by either portion of the mold, etc. Furthermore, the method is not limited to switch members but may be used advantageously whenever flash-free insert surfaces are desired regardless of their position in the molded part.

While the embodiments of the invention as herein disclosed, constitute preferred forms, it is to be understood that other forms might be adopted.

What is claimed is as follows:

The method of molding a composite switch article of a moldable dielectric material and an embedded metal part so as to obtain a finished composite article having an exposed surface of said metal part flush with one surface of said article wherein said surface is entirely free from objectionable molding flash and has a recess around its periphery, comprising the steps of; providing a mold member having a molding cavity therein, providing in said molding cavity a positioning and holding means capable of holding a metal part firmly against axial stresses directed inwardly of said first molding member, providing a metal part having a tapered portion which digresses away from one surface thereof, inserting said metal part entirely into said molding cavity and into operative association with said positioning and holding means so that said one surface is flush with the top of said molding cavity, providing a second molding member for cooperation with said first molding member to close said cavity, affixing into said second molding member a tubular metal member having an end with a configuration geometrically similar to the peripheral configuration of said tapered portion of said metal part and having an inner diameter smaller than the largest diameter of said tapered portion but larger than the smallest diameter of said tapered portion, placing said first and second molding members into operative engagement and simultaneously pressing said tubular member into scarfing sealing engagement with the periphery of said tapered portion, and molding a dielectric material in said molding cavity whereby a composite article having a metal surface entirely free from flash and having a recess around the periphery of said metal surface is produced.

References Cited in the file of this patent

UNITED STATES PATENTS

| | | |
|---|---|---|
| 1,886,176 | Gagnon | Nov. 1, 1932 |
| 2,040,674 | Severance et al. | May 12, 1936 |
| 2,169,378 | Williams | Aug. 15, 1939 |
| 2,661,498 | Blaurock | Dec. 8, 1953 |
| 2,677,855 | Mallory | May 11, 1954 |
| 2,724,864 | Krotz | Nov. 29, 1955 |